No. 880,379. PATENTED FEB. 25, 1908.
F. E. GRIFFETH.
HAND PLANTER.
APPLICATION FILED JULY 15, 1907.
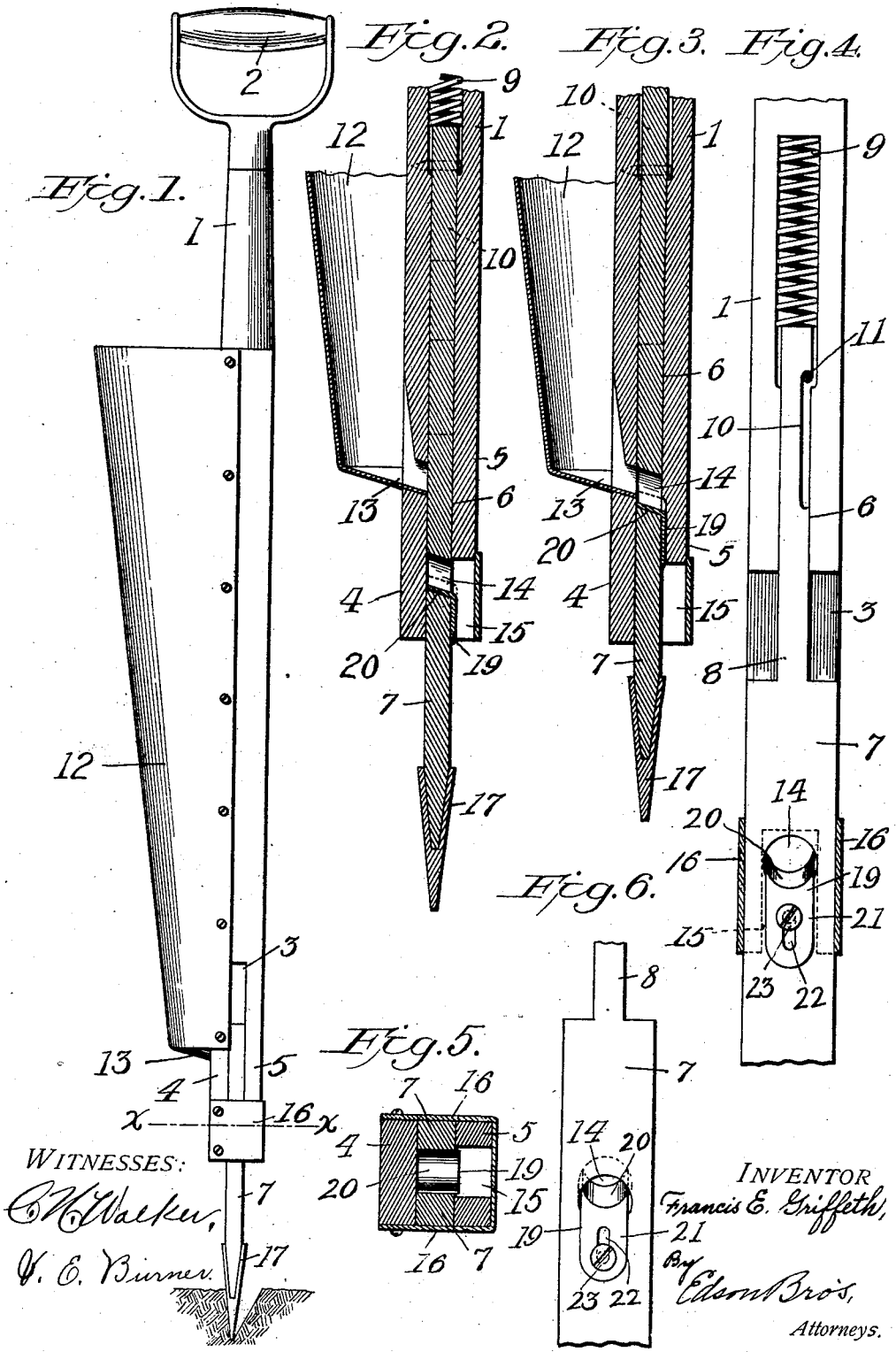
WITNESSES:
C. N. Walker
V. E. Burner
INVENTOR
Francis E. Griffeth,
By Edson Bro's,
Attorneys.

UNITED STATES PATENT OFFICE.

FRANCIS E. GRIFFETH, OF ATHENS, GEORGIA.

HAND-PLANTER.

No. 880,379.  Specification of Letters Patent.  Patented Feb. 25, 1908.

Application filed July 15, 1907. Serial No. 383,882.

*To all whom it may concern:*

Be it known that I, FRANCIS E. GRIFFETH, a citizen of the United States, residing at Athens, in the county of Clarke and State of Georgia, have invented certain new and useful Improvements in Hand-Planters; and I do hereby declare the following to be a full, clear, and exact description of the invention, such as will enable others skilled in the art to which it appertains to make and use the same.

My invention relates to improvements in hand planters for planting peas, corn and other small seed.

It has for its object to provide a simple, cheap and convenient device of this nature which will insure the dropping of the seed regularly.

The invention consists in the features of construction and combinations of parts hereinafter described and specified in the claims.

In the accompanying drawings illustrating the preferred embodiment of my invention: Figure 1 is a side elevation of the planter in use. Fig. 2 is an enlarged central longitudinal section of the lower part of the device showing the plunger down. Fig. 3 is a similar view showing the plunger raised so as to compress the spring. Fig. 4 is a longitudinal sectional view taken at right angles to that in Figs. 2 and 3. Fig. 5 is a sectional view on the line x—x of Fig. 1, and Fig. 6 is a broken detail face view of a part of the plunger showing the adjustable plate for regulating the amount of seed fed at each operation.

Referring more particularly to the drawing, 1 designates the rod or staff which carries the handle 2. The lower end of said rod is bifurcated or forked at 3 forming two prongs 4 and 5. At the base of said bifurcation a socket 6 is cut farther up into the rod. The plunger 7 is fitted between said prongs and has a reduced extension 8 arranged in the socket 6. A coiled spring 9 is placed in said socket above said extension whereby the plunger is normally held extended. Said extension 8 is recessed at 10 and through said recess is passed a bolt or pin 11 which is adapted to engage the ends of said recess and thus form a stop to limit the downward movement of the plunger.

The hopper 12 is arranged on the front of the rod or staff. The seed are adapted to pass from the base of said hopper into a perforation 13 in the front prong 4 of the fork of said rod. From thence said seed pass into the pocket 14 in the plunger when said pocket is arranged opposite said perforation 13 which is the case when said plunger is raised to the limit of its upward movement. When the plunger passes down to the lowest extremity of its movement, said pocket registers with the slot 15 in the end of the rear prong 5 of the fork of said rod. Said slot is guarded by a ferrule 16 secured to the lower end of the prong 4 whereby the seed is guided downward so that it is delivered directly behind the pointed end 17 of the plunger.

In use the rod or staff is carried in the hand like a cane and the projecting pointed end of the plunger is thrust into the ground on an incline where it is desired to plant some seed. The pressure exerted on the handle to force the plunger into the ground retracts said plunger against the coiled spring to the limit of its upward movement. This brings the pocket in said plunger in line with the perforation in the front prong 4 so that seed are fed into said pocket. The plunger and rod are held in this position while they are brought to an upright or nearly an upright position leaving an opening in the ground behind the point of said plunger. Then the pressure on the handle is removed allowing the rod to rise until the pocket in the plunger registers with the slot in the end of the rear prong 5 whereby the seed are dropped into the opening in the ground behind the plunger. The rod is then raised removing the plunger from the ground and allowing the earth, which has been piled up in front of said plunger, as shown in Fig. 1, to fall back and cover or partially cover the seed. If necessary, the seed may be more thoroughly covered by a stroke with the end of the planter or by treading over the hole with one foot.

The amount of seed fed at each operation of the planter is regulated by means of an adjustable plate 19 which has a bent concave portion 20 extending into the pocket 14 in the plunger. The flat portion 21 of said plate is provided with a slot 22 through which a screw 23 is passed by means of which said plate is secured in the desired position. It will be observed from Fig. 3, that when the plunger is raised so that the spring is compressed to the limit, the bottom edge of the pocket 14 is somewhat below the bottom edge of the perforation 13 in the front prong 4. This allows the adjustable plate 19 to slide up and partially close or reduce the size of the pocket without the bent portion 20 of said plate passing the bottom edge of said perforation 13, thus preventing seed from getting under said bent portion of said plate and leaving no obstruction to the seed falling into the pocket.

It will be noted that the placing of the seed hopper on the front of the planter is a great advantage over placing it on the back, for in the latter case the seed may have to be forced upward into the passage which carries them to the discharge opening, whereas in my construction the seed follow their course to the discharge slot by force of gravity. The base of the hopper, the perforation 13 and the pocket 14 are all preferably arranged on an incline to aid in the delivery of the seed.

I claim:

1. A hand planter consisting of a rod bifurcated at its lower end, a spring pressed plunger mounted to reciprocate in said bifurcation and having its end projecting from said rod to engage the ground and form an opening therein to receive the seed, a hopper secured to said rod and communicating with a perforation in one of the prongs of said rod, the other prong having a discharge slot in its end, said plunger provided with a perforation forming a pocket adapted to convey seed from the perforation in one prong to the discharge slot in the other as said plunger is reciprocated.

2. A hand planter consisting of a rod bifurcated at its lower end, a spring pressed plunger mounted to reciprocate in said bifurcation and having its end projecting from said rod to engage the ground and form an opening therein to receive the seed, a hopper secured on the front of said rod and communicating with a perforation in the front prong of said rod, the rear fork having a slot in its end, said plunger provided with a perforation forming a pocket adapted to convey seed from the perforation in said front prong to the discharge slot in the rear prong as said plunger is reciprocated.

3. A hand planter consisting of a rod bifurcated at its lower end, a spring pressed plunger mounted to reciprocate in said bifurcation and having its end projecting from said rod to engage the ground and form an opening therein to receive the seed, a hopper secured on the front of said rod and communicating with a rearwardly and downwardly inclined perforation in the front prong of said rod, the rear fork having a slot in its end, said plunger provided with a rearwardly and downwardly inclined perforation forming a pocket adapted to convey seed from the perforation in said front prong to the discharge slot in the rear prong as said plunger is reciprocated.

4. A hand planter consisting of a rod bifurcated at its lower end, a spring pressed plunger mounted to reciprocate in said bifurcation and having its end projecting from said rod to engage the ground and form an opening therein to receive the seed, a hopper secured to said rod and communicating with a perforation in one of the prongs of said rod, the other prong having a discharge slot in its end, said plunger provided with a perforation forming a pocket adapted to convey seed from the perforation in one prong to the discharge slot in the other as said plunger is reciprocated, and means to limit the movement of said plunger so that when it is at the upper end of its stroke the pocket will be in line with the perforation communicating with the hopper and when at the lower end of its stroke said pocket will register with the discharge slot in the other prong.

5. A hand planter consisting of a rod bifurcated at its lower end, a spring pressed plunger mounted to reciprocate in said bifurcation and having its end projecting from said rod to engage the ground and form an opening therein to receive the seed, a hopper secured to said rod and communicating with a perforation in one of the prongs of said rod, the other prong having a discharge slot in its end, said plunger provided with a perforation forming a pocket adapted to convey seed from the perforation in one prong to the discharge slot in the other as said plunger is reciprocated, said plunger being normally held in its projected position with the pocket therein arranged opposite said discharge slot, said pocket adapted to register with the perforation in the prong of said rod leading from the hopper when the plunger is pressed inward.

6. A hand planter consisting of a rod bifurcated at its lower end, a spring pressed plunger mounted to reciprocate in said bifurcation and having its end projecting from said rod to engage the ground and form an opening therein to receive the seed, a hopper secured to said rod and communicating with a perforation in one of the prongs of said rod, the other prong having a discharge slot in its end, said plunger provided with a perforation forming a pocket adapted to convey seed from the perforation in one prong to the discharge slot in the other as said plunger is reciprocated, and an adjustable plate secured to said plunger and having a concave portion extending into the pocket therein and having its face conforming to the wall of said pocket to regulate the amount of seed fed at each operation.

7. A hand planter consisting of a rod bifurcated at its lower end, a spring pressed plunger mounted to reciprocate in said bifurcation and having its end projecting from said rod to engage the ground and form an opening therein to receive the seed, a hopper secured to said rod and communicating with a perforation in one of the prongs of said rod, the other prong having a discharge slot in its end, said plunger provided with a perforation forming a pocket adapted to convey seed from the perforation in one prong to the discharge slot in the other as said plunger is reciprocated, an adjustable plate secured to said plunger and having a concave portion extending into the pocket therein and having its face conforming to the wall of said pocket to regulate the amount of seed fed at each operation, and means to limit the movement of said plunger so that at its uppermost position the lower edge of said pocket will be arranged below the lower edge of the perforation communicating with the hopper for the purpose specified.

8. A hand planter consisting of a rod bifurcated at its lower end, a spring pressed plunger mounted to reciprocate in said bifurcation and having its end projecting from said rod to engage the ground and form an opening therein to receive the seed, a hopper secured to said rod and communicating with a perforation in one of the prongs of said rod, the other prong having a discharge slot in its end, said plunger provided with a perforation forming a pocket, adapted to convey seed from the perforation in one prong to the discharge slot in the other as said plunger is reciprocated, and a ferrule arranged around the discharge slot for the purpose specified.

9. A hand planter consisting of a rod bifurcated at its lower end and having an operating handle at its upper end, a spring pressed plunger mounted to reciprocate in said bifurcation, and having its end projecting from said rod to engage the ground and form an opening therein to receive the seed, a hopper secured to said rod and communicating with a perforation in one of the prongs of said rod, the other prong having a discharge slot in its end, said plunger provided with a perforation forming a pocket adapted to convey seed from the perforation in one prong to the discharge slot in the other as said plunger is reciprocated.

10. A hand planter consisting of a rod bifurcated at its lower end and having an operating handle at its upper end, a spring pressed plunger mounted to reciprocate in said bifurcation, said plunger terminating within said rod and having its end projecting from said rod to engage the ground and form an opening therein to receive the seed, a hopper secured to said rod and communicating with a perforation in one of the prongs of said rod, the other prong having a discharge slot in its end, said plunger provided with a perforation forming a pocket adapted to convey seed from the perforation in one prong to the discharge slot in the other as said plunger is reciprocated.

11. A hand planter consisting of a rod bifurcated at its lower end, a spring pressed plunger mounted to reciprocate in said bifurcation, and having its end projecting from said rod to engage the ground and form an opening therein to receive the seed, a hopper secured on the front of said rod and communicating with a rearwardly and downwardly inclined perforation in the front prong of said rod, the rear fork having a slot in its end, said plunger provided with a rearwardly and downwardly inclined perforation forming a pocket adapted to convey seed from the perforation in said front prong to the discharge slot in the rear prong as said plunger is reciprocated, said plunger being normally held in its projected position with the pocket therein arranged opposite said discharge slot, said pocket adapted to register with the perforation in the prong of said rod leading from the hopper when the plunger is pressed inward.

12. A hand planter consisting of a rod bifurcated at its lower end and having an operating handle at its upper end, a spring pressed plunger mounted to reciprocate in said bifurcation, and having its end projecting from said rod to engage the ground and form an opening therein to receive the seed, a hopper secured to said rod and communicating with a perforation in one of the prongs of said rod, the other prong having a discharge slot in its end, said plunger provided with a perforation forming a pocket adapted to convey seed from the perforation in one prong to the discharge slot in the other as said plunger is reciprocated, said plunger being normally held in its projected position with the pocket therein arranged opposite said discharge slot, said pocket adapted to register with the perforation in the prong of said rod leading from the hopper when the plunger is pressed inward.

In testimony whereof, I affix my signature, in presence of two witnesses.

FRANCIS E. GRIFFETH.

Witnesses:
C. A. LAMBERT,
J. H. GRIFFETH, Jr.